United States Patent
Bai et al.

(10) Patent No.: US 11,514,090 B2
(45) Date of Patent: Nov. 29, 2022

(54) COMMENTS-ORDERING METHOD, APPARATUS, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Jianmin Bai, Beijing (CN); Junling Liu, Beijing (CN); Kechen Lin, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/212,237

(22) Filed: Mar. 25, 2021

(65) Prior Publication Data

US 2021/0334297 A1 Oct. 28, 2021

(30) Foreign Application Priority Data

Apr. 27, 2020 (CN) .......................... 202010345510.8

(51) Int. Cl.
*G06F 16/31* (2019.01)
*G06F 16/957* (2019.01)
(Continued)

(52) U.S. Cl.
CPC ........ *G06F 16/31* (2019.01); *G06F 16/24578* (2019.01); *G06F 16/335* (2019.01); *G06F 16/9535* (2019.01); *G06F 16/9577* (2019.01)

(58) Field of Classification Search
CPC .. G06F 16/31; G06F 16/24578; G06F 16/335; G06F 16/9535; G06F 16/9577; G06F 16/22; G06F 16/27; G06F 16/288
See application file for complete search history.

(56) References Cited

U.S. PATENT DOCUMENTS

2007/0067297 A1  3/2007  Kublickis
2012/0158753 A1*  6/2012  He ........................ G06F 16/957
                                                  707/752
(Continued)

FOREIGN PATENT DOCUMENTS

JP       H06348554 A    12/1994
JP       2002092474 A    3/2002
(Continued)

OTHER PUBLICATIONS

Agarwal et al., "Personalized Recommendation of User Comments via Factor Models", Proceedings of the 2011 Conference on Empirical Methods in Natural Language Processing, pp. 571-582, published 2011. (Year: 2011).*

(Continued)

*Primary Examiner* — Taelor Kim
(74) *Attorney, Agent, or Firm* — Kwan & Olynick LLP (57) ABSTRACT

The present disclosure provides a method for ordering comments, and apparatus, device and computer storage medium thereof, which relates to the technical field of 5 big data. A specific implementation solution is as follows: obtaining comments data, ordering the comments based on basic attributes of the comment to obtain a first ordering result, and establishing an index for the first ordering result; in response to obtaining an event of the user triggering display of the comments, obtaining the first ordering result through the index, and performing ordering adjustment on the first 10 ordering result based on the user's feature data to obtain a second ordering result which serves as a basis for displaying the comments to the user. The present disclosure can meet the user's personalized needs for comment ordering.

10 Claims, 5 Drawing Sheets

(51) Int. Cl.
*G06F 16/2457* (2019.01)
*G06F 16/335* (2019.01)
*G06F 16/9535* (2019.01)

(56) References Cited

U.S. PATENT DOCUMENTS

| | | |
|---|---|---|
| 2013/0204833 A1 | 8/2013 | Pang et al. |
| 2014/0280236 A1* | 9/2014 | Faller ................ G06F 16/24578 707/749 |
| 2014/0379682 A1* | 12/2014 | Du ..................... G06F 16/9535 707/706 |
| 2015/0193540 A1* | 7/2015 | Wexler ............... G06F 16/9535 707/734 |
| 2016/0224574 A1* | 8/2016 | Horvitz ................ G06F 16/332 |
| 2017/0139920 A1* | 5/2017 | Ball ......................... H04L 51/32 |
| 2017/0169029 A1* | 6/2017 | Song .................... G06F 16/313 |
| 2017/0244728 A1* | 8/2017 | Kirkham ................ G06F 21/31 |
| 2018/0197109 A1* | 7/2018 | Taylor .................... H04L 67/22 |
| 2018/0329582 A1* | 11/2018 | Clediere ............. G06Q 10/107 |
| 2019/0034441 A1 | 1/2019 | Capon |
| 2019/0278815 A1* | 9/2019 | Capon ..................... G06F 16/00 |

FOREIGN PATENT DOCUMENTS

| | | |
|---|---|---|
| JP | 2003271618 A | 9/2003 |
| JP | 2013506928 A | 2/2013 |
| JP | 2019191659 A | 10/2019 |

OTHER PUBLICATIONS

Extended European Search Report, EP Application No. 21164455.4 dated Sep. 16, 2021, 12 pages.
Communication pursuant to Art. 94(3) EPC for Application EP21164455.4 dated Aug. 9, 2022, 9 pages.
First Office Action for JP2021-072218 dated Jul. 6, 2022, 4 pages.

* cited by examiner

COMMENTS-ORDERING METHOD, APPARATUS, DEVICE AND COMPUTER STORAGE MEDIUM

The present application claims the priority of Chinese Patent Application No. 202010345510.8, filed on Apr. 27, 2020, with the title of "Comments-ordering method, apparatus, device and computer storage medium". The disclosure of the above application is incorporated herein by reference in its entirety.

FIELD OF THE DISCLOSURE

The present disclosure relates to the technical field of computer application, and particularly to big data technology.

BACKGROUND OF THE DISCLOSURE

Under multiple scenarios in which users buy products, experience services, browse information and contact social media, users' comments will be involved. The users' comments have already become important displayed content to help the users to acquire useful information therefrom or assist the users in making a decision. However, according to the current tendency, users' comments occupy a very large space when displayed, and some comments even include tens of thousands of massive data. To assist users in quickly finding useful comment information, the ordering of the users' comments appears particularly important.

In the prior art, the comments are ordered mainly based on MySQL (Relational Database Management System), and according to time, the number of likes or the like. However, such an ordering manner can only support a fixed ordering manner based on time or the number of likes, and cannot satisfy users' personalized needs. As a result, the users need to spend a lot of time in browsing the ordered user comments to find comments that meet their own needs, and even perform operations such as turning pages.

SUMMARY OF THE DISCLOSURE

In view of the above technical problems, the present disclosure provides a method for ordering comments, and apparatus, device and computer storage medium thereof, to meet the user's personalized needs.

In a first aspect, the present disclosure provides a method for ordering comments, comprising: obtaining comments data, ordering the comments based on basic attributes of the comment to obtain a first ordering result, and establishing an index for the first ordering result; in response to obtaining an event of the user triggering display of the comments, obtaining the first ordering result through the index, and performing ordering adjustment on the first ordering result based on the user's feature data to obtain a second ordering result which serves as a basis for displaying the comments to the user.

In a second aspect, the present disclosure provides an electronic device, comprising:

at least one processor; and a memory communicatively connected with the at least one processor;

wherein the memory stores instructions executable by the at least one processor, and the instructions are executed by the at least one processor to enable the at least one processor to perform a method for ordering comments, wherein the method comprise:

obtaining comments data, ordering the comments based on basic attributes of the comment to obtain a first ordering result, and establishing an index for the first ordering result;

in response to obtaining an event of the user triggering display of the comments, obtaining the first ordering result through the index, and performing ordering adjustment on the first ordering result based on the user's feature data to obtain a second ordering result which serves as a basis for displaying the comments to the user.

In a third aspect, the present disclosure further provides a non-transitory computer readable storage medium with computer instructions stored thereon, wherein the computer instructions are used for causing a computer to perform a method for ordering comments, wherein the method comprises:

obtaining comments data, ordering the comments based on basic attributes of the comment to obtain a first ordering result, and establishing an index for the first ordering result;

in response to obtaining an event of a user triggering display of the comments, obtaining the first ordering result through the index, and performing ordering adjustment on the first ordering result based on the user's feature data to obtain a second ordering result which serves as a basis for displaying the comments to the user.

As can be seen from the above technical solutions, the present disclosure is divided into two portions: in one portion, comments are sorted based on basic attributes of the comments to obtain the first ordering result, and an index is established for the first ordering result; in the second portion, when the event of triggering the display of the comments is obtained, the first ordering result and corresponding comment data are obtained through the above index, and ordering adjustment is performed on the first ordering result based on the user's feature data to obtain a second ordering result, thereby satisfying the user's personalized needs for comment ordering, helping the user to quickly browse the desired comment content, saving the user's time and improving the user's browsing efficiency.

Other effects of the above optional modes will be described below in conjunction with specific embodiments.

BRIEF DESCRIPTION OF DRAWINGS

The figures are intended to facilitate understanding the solutions, not to limit the present disclosure. In the figures.

DETAILED DESCRIPTION OF PREFERRED EMBODIMENTS

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Figure 1:
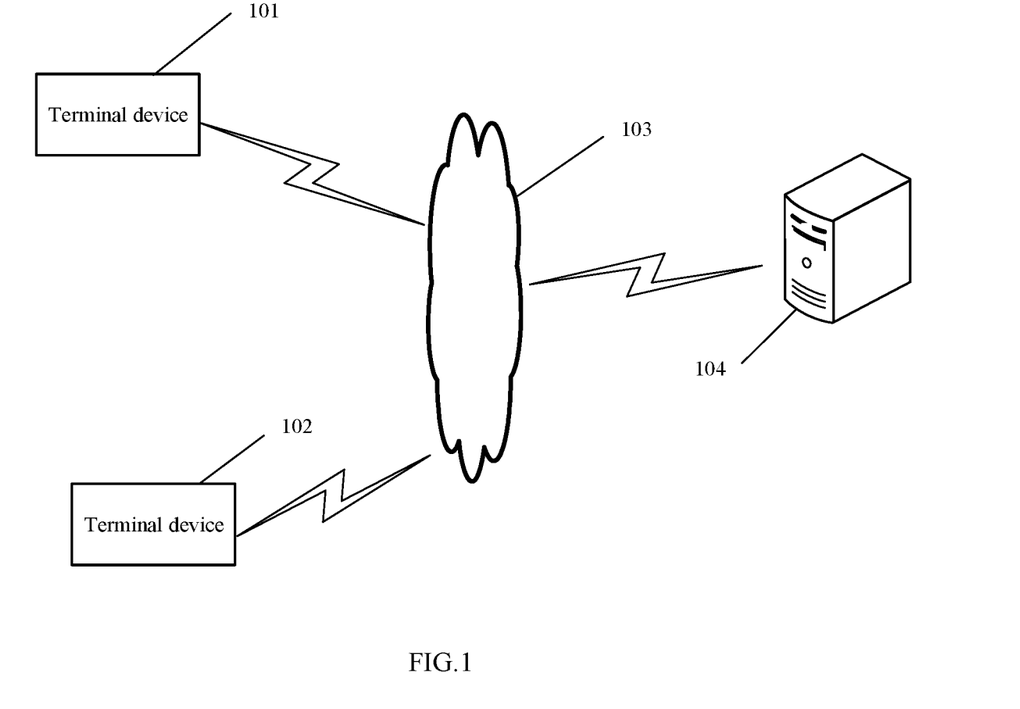
FIG. 1 illustrates an exemplary system architecture in which a comments-ranking method and apparatus according to embodiments of the present disclosure may be applied.

FIG. 1 illustrates an exemplary system architecture in which a comments-ranking method and apparatus according to embodiments of the present disclosure may be applied.

As shown in FIG. 1, the system architecture may comprise terminal devices 101 and 102, a network 103 and a server 104. The network 103 is used to provide a medium for a communication link between the terminal devices 101, 102 and the server 104. The network 103 may comprise various connection types such as wired link, a wireless communication link or an optical fiber cable.

The user may use the terminal devices 101 and 102 to interact with the server 104 via the network 103. The terminal devices 101 and 102 may have various applications installed thereon, such as voice interaction applications, webpage browser applications, communication-type applications, etc.

The terminal devices 101 and 102 may include but not limited to smart phones, tablet computers, smart TV sets, smart wearable devices, PCs etc. The server 104 may be a single server or a cluster of servers composed of a plurality of servers.

The apparatus for ordering comments according to the present disclosure may be disposed and run on the server 104, and it may be implemented as a plurality of software or software modules (e.g., for providing distributed service) or as a single software or software module, which will not be limited in detail herein.

For example, when the user browses a certain webpage object through the terminal devices 101 and 102, he will trigger the display of the ordering of users' comments on the webpage object in the webpage. The apparatus for ordering comments disposed at the server 104 orders all comments in a manner provided by embodiments of the present disclosure, and then returns the ordering result to the terminal devices 101 and 102 for display to the user.

It should be appreciated that the number of terminal devices, network and server in FIG. 1 is only illustrative. Any number of terminal devices, networks and servers are feasible according to the needs in implementations.

Figure 2:
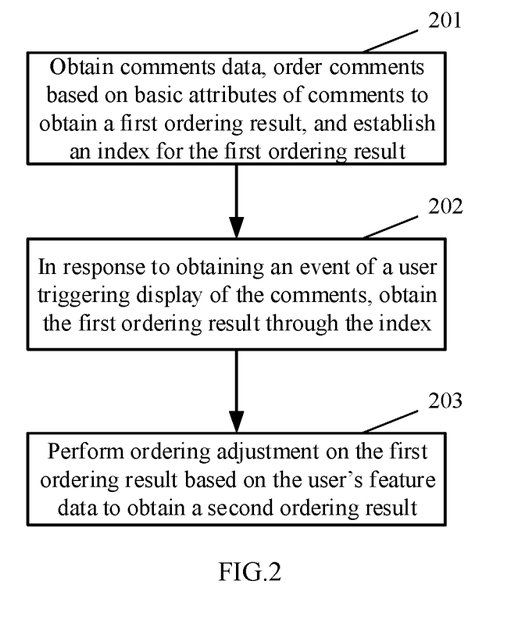
FIG. 2 illustrates a flow chart of a main method according to an embodiment of the present disclosure.

FIG. 2 illustrates a flow chart of a main method according to an embodiment of the present disclosure. As shown in FIG. 2, the method may comprise the following steps:

At 201, obtain comments data, order the comments based on basic attributes of the comment to obtain a first ordering result, and establish an index for the first ordering result.

What is achieved in the step is offline coarse ordering service of comments, i.e., offline coarse ordering of the comments based on the basic attributes of the comments. Such service is hereinafter referred to as offline coarse ordering service.

At 202, when an event of the user triggering display of the comments is obtained, the first ordering result is obtained through the above index.

At 203, ordering adjustment is performed on the first ordering result based on the user's feature data to obtain a second ordering result.

What is achieved in steps 202 and 203 is online fine ordering service of comments, namely, online real-time personalized fine ordering performed for the user, and further fine ordering performed on the first ordering result based on the user's feature data. Such service will be hereinafter referred to as online fine ordering service.

It can be seen from the above main flow of the method, the core idea of the present disclosure lies in first performing offline coarse ordering for comments based on the basic attributes of the comments, and establishing a coarse ordering index; implementing further fine ordering on the coarse ordering result based on the user's feature data when comment data needs to be displayed to the user, thereby implementing personalized ordering for the user; additionally, the offline coarse ordering service ensures real-time performance of the online fine ordering service.

The above method will be described in detail below in conjunction with specific embodiments.

Figure 3:
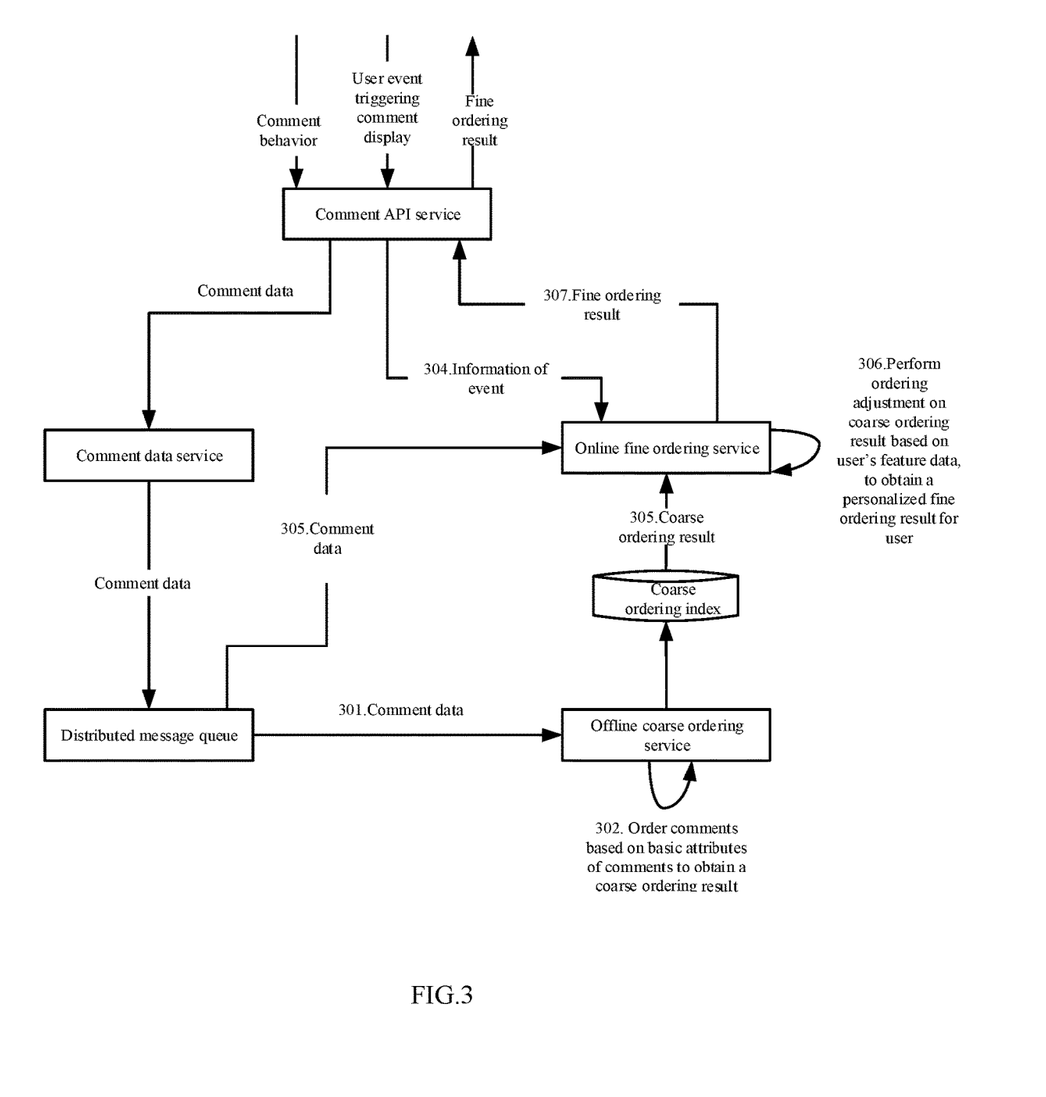
FIG. 3 illustrates a flow chart of a detailed method according to an embodiment of the present disclosure.

As shown in FIG. 3, the user's commenting behavior for the webpage object on the webpage is implemented by invoking a comment API service. The webpage object may include but not limited to a product, a service, a consultation, content published on social media etc., so long as the webpage object is an object for which the user can produce a comment.

Regarding a commenting service, it provides a comment API service to the outside, and it is mainly responsible for functions such as protocol management, acquisition of comment data, log statistics, and buffer management.

The comment data enters a distributed message queue through a comment data service, and the comment data service is responsible for state management and relationship maintenance of the comment data. The state management refers to managing the state of the comment data. The state of the comment data may include in-verification, already-published, already-cancelled etc. Usually, the distributed message queue provides the already-published comment data to the offline coarse ordering service only.

The implementation of the comment API service and the comment data service is substantially the same as that in the prior art, and will not be detailed any more here.

Step 201 in FIG. 2 may be performed by an offline coarse ordering service shown in FIG. 3. The offline coarse ordering service is first obtaining the comment data from a distributed message queue at 301. A specific implementation mode may employ but is not limited to the following two manners:

The first manner: if the distributed message queue is triggered by a comment alteration event, formatted comment data will be actively pushed to the offline coarse ordering service.

Specifically, the comment alteration event may include for example adding, deleting or amending comments. Such an event triggers the invocation for the comment API service, and information of the event will be transferred to the distributed message queue via the comment data. The distributed message queue actively pushes the corresponding formatted comment data to the offline coarse ordering service. The active push of the comment data may be implemented in a manner that the offline coarse ordering service first subscribes to data from the distributed message queue.

For example, once newly-added or amended comments appear, the distributed message queue will actively push the newly-added or amended comment data to the offline coarse ordering service, thereby triggering the offline coarse ordering service to coarsely order the newly-added or amended comments.

If deletion of a comment occurs, the distributed message queue will also actively push the deleted comment data to the offline coarse ordering service, thereby triggering the offline coarse ordering service to delete the ordering result of the comment in time.

The second manner: the offline coarse ordering service periodically obtains the formatted comment data from the distributed message queue.

In this manner, in each given period, the offline coarse ordering service may request the distributed message queue for comment data. The distributed message queue sends the formatted comment data to the offline coarse ordering service, wherein the sent comment data may be comment data that has altered in this period.

For example, the offline coarse ordering service requests the distributed message queue for comment data at an interval of 10 minutes. The distributed message queue will send the newly-added, amended and deleted comment data within the 10 minutes to the offline coarse ordering service for offline coarse ordering.

The so-called "formatted" in the "formatted comment data" involved in the above two manners means providing the comment data in a format supported by the offline coarse ordering service.

At 302, the offline coarse ordering service orders the comments based on the basic attributes of the comments to obtain a coarse ordering result. The basic attributes of the comments may include but not limited to: comment content, the number of likes for the comment, comment time, and grades of users who comment.

Regarding the offline coarse ordering service, the comment data obtained from the distributed message queue may be stored in a local task queue. The offline coarse ordering service will score each comment data in the task queue to obtain a score result.

Specifically, the offline coarse ordering service may first obtain a ordering policy configuration, where the ordering policy configuration may include an operator combination employed by a ordering policy. Then, according to the ordering policy configuration, the offline coarse ordering service invokes the operators to score the comments based on the basic attributes of the comments on which the operators depend to obtain score results of respective comments. In fact, the coarse ordering results are the score results of respective comments.

In addition to the score results, the coarse ordering result may also be a result of ordering the comments according to the score results.

Regarding the offline coarse ordering service, more than one ordering policy may be configured. Each ordering policy may be defined by an operator combination. If a plurality of ordering policies are included, indexes may be established for the coarse ordering results corresponding to respective ordering policies when indexes are established for the coarse ordering results in subsequent step 303.

Figure 4:
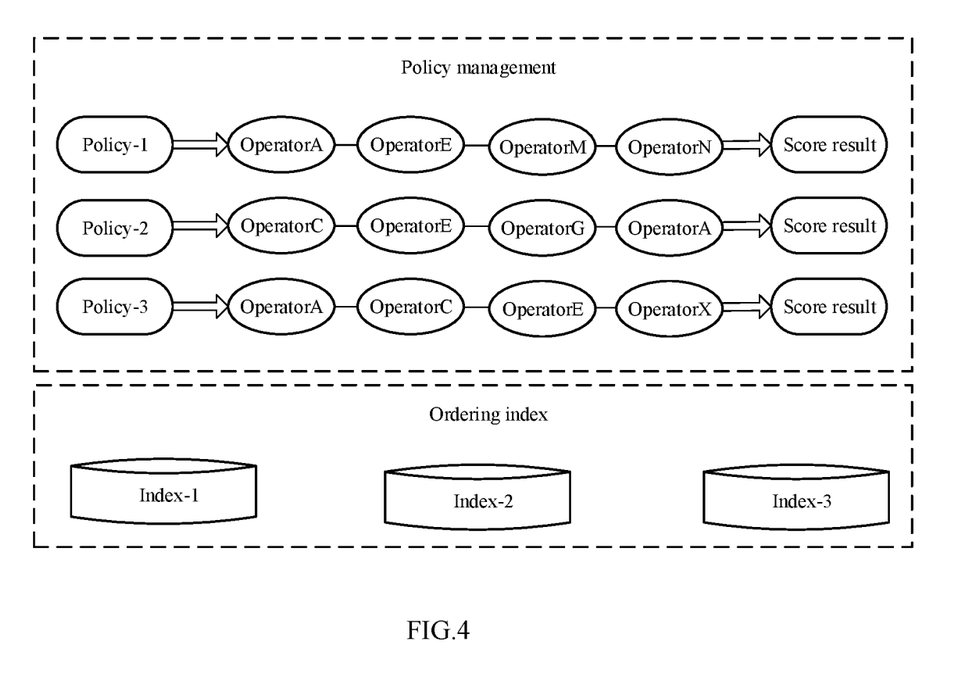
FIG. 4 illustrates a schematic diagram of configuration of a ordering policy according to an embodiment of the present disclosure.

As shown in FIG. 4, the operator combination corresponding to policy 1 is: operator A, operator E, operator M and operator N. After the respective comment data are scored according to the policy 1, the score results of the respective comment data are obtained. The operator combination corresponding to policy 2 is: operator C, operator E, operator G and operator A. After the respective comment data are scored according to the policy 2, the score results of the respective comment data are obtained. The operator combination corresponding to policy 3 is: operator A, operator C, operator E and operator X. After the respective comment data are scored according to the policy 3, the score results of the respective comment data are obtained.

Then, indexes, namely, index 1, index 2 and index 3, are established for the coarse ordering results corresponding to policy 1, policy 2 and policy 3, respectively.

More specifically, the index-establishing result under each policy is establishing an index of the score result of each comment. For example, an ID of each comment is taken as an index. The score result of the corresponding comment can be obtained by querying for the ID of the comment.

There exists such an application scenario in which when an experiment needs to be performed on the comment ordering policy, a plurality of ordering policies may be configured for invocation by online fine ordering service, thereby trying out which ordering policy achieves an optimal effect.

The operator involved in the above policy refers to a subfunction used in the process of scoring the respective comment data. Each operator depends on at least one type of basic attributes of comments. Usually, each operator depends on one type of basic attributes of comments.

A simple example is taken. According to a policy, after a comment is scored respectively based on the number of likes for comments, quality of comment content and grades of users who comment, and the scores are weighted to obtain a final score result for the comment. In this case, the policy may include three operators: the first operator is scoring the comment based on the number of likes for the comment and multiplying the score by a weighing coefficient, where the basic attribute of comments on which the operator depends on is the number of likes for the comment; the second operator is scoring the comment based on the quality of comment content and multiplying the score by a weighing coefficient, where the basic attribute of comments on which the operator depends on is the quality of comment content; the third operator is scoring the comment based on the grades of users which comment and multiplying the score by a weighing coefficient, where the basic attribute of comments on which the operator depends on is the grades of users who comment.

In embodiments of the present disclosure, each operator may be an independent class file, and the operators may be freely combined in respective ordering policies.

Furthermore, the above ordering policy configuration may further comprise an operator-dependent data relationship. Parallel invocation for the operators may be implemented based on the operator-dependent data relationship. The parallel invocation manner may employ any implementable manner, for example, the operator-dependent data relationship is taken as a directed acyclic graph in which nodes are the operator-dependent data, and sides are the data relationship. First, parallel invocation is performed for the operators corresponding to all nodes with an in-degree 0 for computation processing (the computation processing in embodiments of the present disclosure is based on the scores of operators). After the nodes where the operators after completion of the computation processing lie are deleted, parallel invocation is performed for the operators corresponding to all nodes with an in-degree 0 for computation processing, and so on so forth, until the invocation of all operators in the ordering policy is completed.

At 304, obtaining the event of the user triggering the display of comments, the comment API service provides information of the event to the online fine ordering service.

In the present disclosure, a manner in which the user triggers the display of the comments is not limited. For example, the user may open a webpage of a certain webpage object, and pull down to a comment-displaying area; as another example, the user may open a webpage of a certain webpage object and click to trigger a component for displaying comments; for another example, after the user opens a webpage of a certain webpage object, the comments on the webpage object is displayed by default, and the event of user opening the webpage is an event of triggering the display of comments; as another example, the user may trigger with a voice instruction to display the comments on the webpage. Examples will not be exhausted herein.

The information of the event may include user information of the event of triggering the display of the comments, as well as information of the webpage object or information of the webpage. For example, if user A opens the webpage of a certain product and pulls down to the comment area, the information of the event involved includes an ID of user A and an ID corresponding to the product. The user's information is used subsequently to determine the user's feature data. The information of the webpage object or information of the webpage is used to determine the corresponding comment data.

At 305, when the online fine ordering service obtains the event of the user triggering the display of comments, the offline coarse ordering result and the corresponding comment data are obtained through the index.

The online fine ordering service may obtain the corresponding comment data from the distributed message queue through the information of the webpage object or the information of the webpage, and obtain the score result corresponding to the comment ID through the index. If there are a plurality of ordering policies in the offline coarse ordering service, the online fine ordering service may invoke the score result of the comment corresponding to the comment ID under a designated ordering policy.

At 306, the online fine ordering service performs ordering adjustment on the coarse ordering result based on the user's feature data, to obtain a personalized fine ordering result for the user.

Specifically, the order of the comments may be adjusted on the coarse ordering result according to matching degrees of the comments and the user's feature data. The user's feature data may include but not limited to: user attribute information, user social relationship, user emotion analysis result, user historical behaviors etc.

When the matching degrees of the comments and the user's feature data are determined, calculation of the matching degrees may be implemented based on a pre-built matching model. For example, the comment data and the user's feature data are input to the matching model, the matching model can score according to the matching degrees of the comment data and the user's feature data, to obtain the score result based on the user's feature data.

Furthermore, the online fine ordering service may combine the score result of the comment based on the user's feature data with the score result of the comment obtained by the offline coarse ordering service to obtain a final score result of the comment. In the same manner, final score results of the respective comments may be obtained, and the comments are ordered based on the score results.

In addition to the above manner, if the offline coarse ordering result is the order of the comments obtained according to the score results, the online fine ordering service may adjust the order of the comments based on the matching degrees of the user's feature data and the comment data, e.g., put the comments with a high matching degree ahead, etc.

In the above online fine ordering process, the ordering policy configuration may be performed flexibly, i.e., the ordering policy configuration includes an operator combination. In the process of ordering, the comments may be scored according to the ordering policy configuration by invoking the operators based on the user's feature data on which the operators depend. In the process of invoking the operators, the operators may be invoked in parallel based on the operator-dependent data relationship. However, the ordering based on the user's feature data is usually online real-time ordering, so only a preset ordering policy is usually employed.

In addition, in the above ordering adjustment process, the ordering result may further be adjusted according to intervention data to obtain the fine ordering result. The intervention data may be manual intervention data. For example, the user may intervene by setting a specific comment at the top, so that whatever score result of the comment, the comment will be ranked at the topmost position. As another example, if the user may mute a specific comment, the comment will not be displayed, i.e., it is deleted from the final ordering, whatever score result of the comment.

At 307, the online fine ordering service may provide the fine ordering result to the comment API service for display to the user.

So far, the comments may be displayed to the corresponding users in real time based on the fine ordering result.

In addition, when the online fine ordering service provides the fine ordering result to the comment API service, a corresponding number of comments may be provided to the comment API service for display to the user, according to the number of comments as requested by the user end. The online fine ordering service will record the comments already provided for display to the user. Alteration of the comment data might be caused when the user requests for comments on pages. If comments on the currently-requested page have already been displayed to the user on a preceding page, deduplication processing will be performed according to the recorded content, and then the comments on the current page will be provided to the user for review, thereby avoiding repeatedly displaying the comments to the user.

When the online fine ordering service provides the fine ordering result to the comment API service, a comment ID chain table form may be employed.

In the above embodiment, there may further exist such an application scenario that regarding the comment data of the same webpage object, it is possible that different applications invoke the comment data and provide services, and different applications may employ their respective online fine ordering service, but share the offline ordering service; or different applications may respectively employ their respective offline coarse ordering service and online fine ordering service, but all obtain the comment data from the shared distributed message queue.

The method according to the present disclosure is introduced above. The apparatus according to the present disclosure will be described in detail in conjunction with embodiments.

Figure 5:
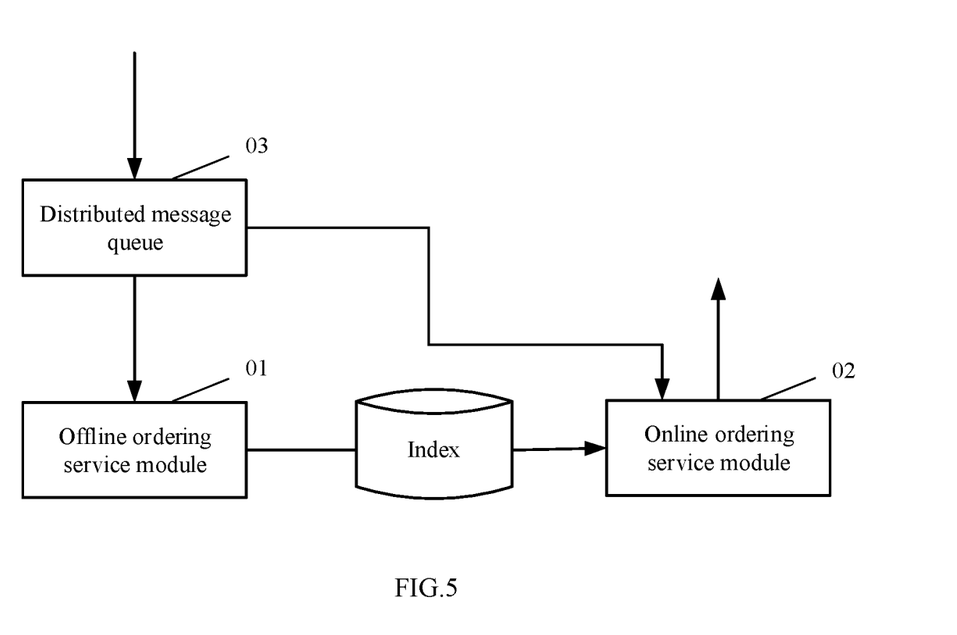
FIG. 5 illustrates a schematic diagram of an apparatus according to an embodiment of the present disclosure.

FIG. 5 illustrates a schematic diagram of an apparatus according to an embodiment of the present disclosure. As shown in FIG. 5, the apparatus may comprise: an offline ordering service module 01 and an online ordering service module 02, and may further comprise a distributed message queue 03 and a comment providing module 04. Main functions of the modules are as follows:

The offline ordering service module 01 obtains comments data, orders the comments based on basic attributes of the comment to obtain a first ordering result, and establishes an index for the first ordering result. The offline ordering service module 01 performs the processing corresponding to the offline coarse ordering service in the embodiment shown in FIG. 3.

When the online ordering service module 02 obtains an event of the user triggering display of the comments, the first ordering result and corresponding comment data are obtained through the above index, and ordering adjustment is performed on the first ordering result based on the user's feature data to obtain a second ordering result.

The distributed message queue 03 collects comment data, and triggered by a comment alteration event, pushes formatted comment data to the offline ordering service module 01. The offline ordering service module 01 receives the comment data pushed by the distributed message queue. The active push of the comment data may be implemented in a manner that the offline coarse ordering service first subscribes to data from the distributed message queue.

There may be another manner:

After receiving the request from the offline ordering service module, the distributed message queue 03 sends formatted comment data to the offline ordering service module 01. The offline ordering service module 01 periodically requests the distributed message queue for the comment data.

The comment alteration event may include for example newly-adding, deleting and amending comments.

In response to obtaining the event of the user triggering the display of comments, the online ordering service module 02 obtains comment data corresponding to the first ordering result.

Specifically, in the process of ordering the comments based on the basic attributes of the comments, the offline ordering service module 01 may obtain a first ordering policy configuration which includes an operator combination employed by an ordering policy; according to the first ordering policy configuration, invoke the operators to score the comments based on the basic attributes of the comments on which the operators depend to obtain score results of the comments.

The basic attributes of the comments may include but not limited to: comment content, the number of likes for the comment, comment time, and grades of users who comment.

In embodiments of the present disclosure, each operator may be an independent class file, and the operators may be freely combined in respective ordering policies.

Furthermore, the first ordering policy configuration may comprise an operator-dependent data relationship.

In the process of invoking the operators, the offline ordering service module 01 may perform parallel invocation for the operators based on the operator-dependent data relationship.

If the first ordering policy configuration includes more than one ordering policy, the offline ordering service module 01 may establish an index for the first ordering result corresponding to each ordering policy.

In the process of performing ordering adjustment on the first ordering result based on the user's feature data, the online ordering service module 02 may adjust the order of the comments on the first ordering result according to matching degrees of the comments and the user's feature data.

Specifically, the online ordering service module 02 may score the comments according to the matching degrees of the comments and the user's feature data; combine the obtained score results of the comments with the score results of the comments in the first ordering result, to obtain final score results of the comments; order the comments based on the final score results of the comments, to obtain the second ordering result.

In the process of scoring the comments according to the matching degrees of the comments and the user's feature data, the online ordering service module 02 may obtain a second ordering policy configuration which includes an operator combination employed by a second ordering policy; according to the second ordering policy configuration, invoke the operators to score the comments based on the user's feature data on which the operators depend to obtain score results of the comments.

The second ordering policy configuration may further comprise an operator-dependent data relationship. In the process of invoking the operators, the offline ordering service module 02 may perform parallel invocation for the operators based on the operator-dependent data relationship.

The user's feature data may include but not limited to: user attribute information, user social relationship, user emotion analysis result, user historical behaviors etc.

Furthermore, after adjusting the ordering of the comments, the online ordering service module 02 is further configured to further adjust the second ordering result based on intervention data.

The comment providing module (not shown) is configured to provide comments to the user for review based on the second ordering result. The comment providing module may be implemented in the comment API service in the embodiment shown in FIG. 3.

According to embodiments of the present disclosure, the present disclosure further provides an electronic device and a readable storage medium.

Figure 6:
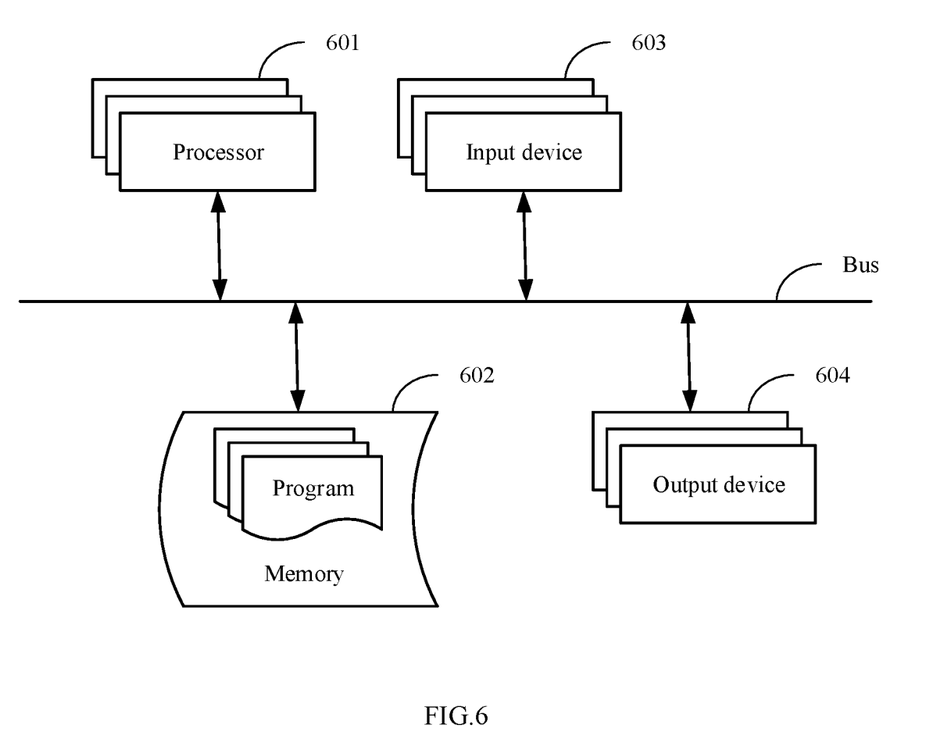
FIG. 6 illustrates a block diagram of an electronic device according to embodiments of the present disclosure.

As shown in FIG. 6, it shows a block diagram of an electronic device for the method for ordering comments according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 6, the electronic device comprises: one or more processors 601, a memory 602, and interfaces configured to connect components and including a high-speed interface and a low speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 601 is taken as an example in FIG. 6.

The memory 602 is a non-transitory computer-readable storage medium provided by the present disclosure. The memory stores instructions executable by at least one processor, so that the at least one processor executes the method for ordering comments according to the present disclosure. The non-transitory computer-readable storage medium of the present disclosure stores computer instructions, which are used to cause a computer to execute the method for ordering comments by the present disclosure.

The memory 602 is a non-transitory computer-readable storage medium and can be used to store non-transitory software programs, non-transitory computer executable programs and modules, such as program instructions/modules corresponding to the method for ordering comments in embodiments of the present disclosure. The processor 601 executes various functional applications and data processing of the server, i.e., implements the method for ordering comments in the embodiments of the present disclosure, by running the non-transitory software programs, instructions and modules stored in the memory 602.

The memory 602 may include a storage program region and a storage data region, wherein the storage program region may store an operating system and an application program needed by at least one function; the storage data region may store data created by the use of the electronic device for implementing the item-recommending method or the method for training the model for simulating the task in the user's item-clicking behavior. In addition, the memory 602 may include a high-speed random access memory, and may also include a non-transitory memory, such as at least one magnetic disk storage device, a flash memory device, or other non-transitory solid-state storage device. In some embodiments, the memory 602 may optionally include a memory remotely arranged relative to the processor 601, and these remote memories may be connected to the electronic device for implementing the item-recommending method or the method for training the model for simulating the task in the user's item-clicking behavior through a network. Examples of the above network include, but are not limited to, the Internet, an intranet, a local area network, a mobile communication network, and combinations thereof.

The electronic device for implementing the item-recommending method or the method for training the model for simulating the task in the user's item-clicking behavior may further include an input device 603 and an output device 604. The processor 601, the memory 602, the input device 603 and the output device 604 may be connected through a bus or in other manners. In FIG. 6, the connection through the bus is taken as an example.

The input device 603 may receive inputted numeric or character information and generate key signal inputs related to user settings and function control of the electronic device for implementing the item-recommending method or the method for training the model for simulating the task in the user's item-clicking behavior, and may be an input device such as a touch screen, keypad, mouse, trackpad, touchpad, pointing stick, one or more mouse buttons, trackball and joystick. The output device 604 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It can be seen from the above depictions that the method, apparatus, device and computer storage medium according to the present disclosure have the following advantages:

1) The present disclosure is divided into two portions: in one portion, comments are sorted based on basic attributes of the comments to obtain the first ordering result, and an index is established for the first ordering result; in the second portion, when the event of triggering the display of the comments is obtained, the first ordering result and corresponding comment data are obtained through the above index, and ordering adjustment is performed on the first ordering result based on the user's feature data to obtain a second ordering result, thereby satisfying the user's personalized needs for comment ordering, helping the user to quickly browse the desired comment content, saving the user's time and improving the user's browsing efficiency.

2) As mentioned in Background Art, the ordering of comments is mainly based on MySQL in the prior art; the ordering information of the comments in MySQL is usually dynamically updated only in the manner of an offline task, and frequent update of MySQL will cause frequent read from or write into the hard drive, thereby causing serious performance problem. In contrast, in the present disclosure MySQL is not employed, the offline coarse ordering service and online fine ordering service directly obtain comment data from the distributed message queue, and the offline coarse ordering service establishes the coarse ordering index for scheduling by the online fine ordering service. Therefore, the present disclosure is free of the limitation of MySQL, and may employ other storage manners such as a random memory, thereby avoiding the performance problem caused to the frequent read from or write into the hard drive.

3) The ordering policy is configured in a manner of free combination of operators, thereby implementing flexible definition of the ordering policy without necessarily ordering the comments in a fixed manner such as according to the number of likes or time as in the prior art.

4) Through the configuration of the ordering policy, the management policy, the combination relationship of operators and operator-dependent data relationship are pooled to implement parallel schedule of the operators and improve the calculating efficiency in the process of ordering based on the ordering policy based on the operator-dependent data relationship.

5) When the experiment of the comments-ordering policy needs to be performed, a plurality of ordering policies may be configured for schedule by the online fine ordering service, thereby trying out which ordering policy has an optimal effect.

6) Manual intervention of the final ordering result of comments is implemented by increasing intervention data to the online fine ordering service. For example, this can implement placement of a high-quality comment at the topmost position, and achieve a function such as muting some unlawful comments.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A computer-implemented method for ordering comments, wherein the method comprises:
    performing in an offline manner the following: obtaining comments data, ordering the comments based on basic attributes of the comment to obtain a first ordering result, and establishing an index for the first ordering result, wherein the offline manner refers to a non-real-time coarse ordering of the comments;
    in response to detecting an event of a user triggering display of the comments, performing in an online manner the following operations of: obtaining the first ordering result through the index; scoring the comments according to matching degrees of the comments and user's feature data to obtain score results of the comments; combining the obtained score results of the comments with score results of the comments in the first ordering result, to obtain final score results of the comments; ordering the comments based on the final score results of the comments, to obtain a second ordering result; and displaying the comments to the user based on the second ordering result, wherein the online manner refers to a real-time fine ordering of the comments,
    wherein the ordering the comments based on basic attributes of the comments comprises:
    obtaining a first ordering policy configuration which includes an operator combination employed by a first ordering policy;
    according to the first ordering policy configuration, invoking operators to score the comments based on the basic attributes of the comments on which the operators depend to obtain the score results of the comments in the first ordering result, wherein the operators are freely combined in respective ordering policies, with each operator being an independent class file,
    wherein if the first ordering policy configuration includes more than one ordering policy, establishing an index for the first ordering result corresponding to each ordering policy, and
    the first ordering policy configuration further comprises an operator-dependent data relationship, and the invoking the operators comprises: performing parallel invocation for the operators based on the operator-dependent data relationship.

2. The method according to claim 1, wherein the obtaining comment data comprises:
    obtaining comment data pushed by a distributed message queue, triggered by a comment alteration event; or periodically obtaining the comment data from the distributed message queue;
    in response to detecting the event of the user triggering display of the comments, the method further comprises: obtaining comment data from the distributed message queue according to information of the event.

3. The method according to claim 1, wherein the event of the user triggering display of the comments comprises:
    an event of the user clicking a component for triggering display of comments on a webpage; or
    an event of the user sliding the webpage to a comment display area; or
    an event of the user of opening a webpage displaying comments by default; or
    an event of the user of triggering display of comments via a voice instruction.

4. The method according to claim 1, wherein the scoring the comments according to matching degrees of the comments and the user's feature data comprises:
    obtaining a second ordering policy configuration which includes an operator combination employed by a second ordering policy;
    according to the second ordering policy configuration, invoking the operators to score the comments based on the user's feature data on which the operators depend to obtain the score results of the comments.

5. The method according to claim 4, wherein the method further comprises: further adjusting the second ordering result based on intervention data.

6. An electronic device, comprising:
   at least one processor; and
   a memory communicatively connected with the at least one processor;
   wherein the memory stores instructions executable by the at least one processor, and the instructions are executed by the at least one processor to enable the at least one processor to be configured to perform the following:
   in an offline manner: obtain comments data, ordering the comments based on basic attributes of the comment to obtain a first ordering result, and establish an index for the first ordering result, wherein the offline manner refers to a non-real-time coarse ordering of the comments;
   in response to detecting an event of a user triggering display of the comments, in an online manner: obtain the first ordering result through the index; score the comments according to matching degrees of the comments and user's feature data to obtain score results of the comments; combine the obtained score results of the comments with score results of the comments in the first ordering result, to obtain final score results of the comments; order the comments based on the final score results of the comments, to obtain a second ordering result; and display the comments to the user based on the second ordering result, wherein the online manner refers to a real-time fine ordering of the comments,
   wherein the ordering the comments based on basic attributes of the comments comprises:
   obtaining a first ordering policy configuration which includes an operator combination employed by a first ordering policy;
   according to the first ordering policy configuration, invoking operators to score the comments based on the basic attributes of the comments on which the operators depend to obtain the score results of the comments in the first ordering result, wherein the operators are freely combined in respective ordering policies, with each operator being an independent class file,
   wherein if the first ordering policy configuration includes more than one ordering policy, establishing an index for the first ordering result corresponding to each ordering policy, and
   the first ordering policy configuration further comprises an operator-dependent data relationship, and the invoking the operators comprises: performing parallel invocation for the operators based on the operator-dependent data relationship.

7. The electronic device according to claim 6, wherein the obtaining comment data comprises:
   obtaining comment data pushed by a distributed message queue, triggered by a comment alteration event; or periodically obtaining the comment data from the distributed message queue;
   in response to detecting the event of the user triggering display of the comments, obtaining comment data from the distributed message queue according to information of the event.

8. The electronic device according to claim 6, wherein the scoring the comments according to matching degrees of the comments and the user's feature data comprises:
   obtaining a second ordering policy configuration which includes an operator combination employed by a second ordering policy;
   according to the second ordering policy configuration, invoking the operators to score the comments based on the user's feature data on which the operators depend to obtain the score results of the comments.

9. The electronic device according to claim 8, wherein an online ordering service module is configured to further adjust the second ordering result based on intervention data.

10. A non-transitory computer readable storage medium with computer instructions stored thereon, wherein the computer instructions are used for causing a computer to perform a method for ordering comments, wherein the method comprises:
    performing in an offline manner the following: obtaining comments data, ordering the comments based on basic attributes of the comment to obtain a first ordering result, and establishing an index for the first ordering result, wherein the offline manner refers to a non-real-time coarse ordering of the comments;
    in response to detecting an event of a user triggering display of the comments, performing in an online manner the following: obtaining the first ordering result through the index; scoring the comments according to matching degrees of the comments and user's feature data to obtain score results of the comments; combining the obtained score results of the comments with score results of the comments in the first ordering result, to obtain final score results of the comments; ordering the comments based on the final score results of the comments, to obtain a second ordering result; and displaying the comments to the user based on the second ordering result, wherein the online manner refers to a real-time fine ordering of the comments,
    wherein the ordering the comments based on basic attributes of the comments comprises:
    obtaining a first ordering policy configuration which includes an operator combination employed by a first ordering policy;
    according to the first ordering policy configuration, invoking operators to score the comments based on the basic attributes of the comments on which the operators depend to obtain the score results of the comments in the first ordering result, wherein the operators are freely combined in respective ordering policies, with each operator being an independent class file,
    wherein if the first ordering policy configuration includes more than one ordering policy, establishing an index for the first ordering result corresponding to each ordering policy, and
    the first ordering policy configuration further comprises an operator-dependent data relationship, and the invoking the operators comprises: performing parallel invocation for the operators based on the operator-dependent data relationship.

* * * * *